United States Patent
McCorkendale et al.

(10) Patent No.: US 8,413,146 B1
(45) Date of Patent: Apr. 2, 2013

(54) HYPERVISOR ASSISTED SINGLE INSTANCE DATA ACCESS BY MULTIPLE VIRTUAL MACHINES

(75) Inventors: Bruce McCorkendale, Manhattan Beach, CA (US); David Buches, Westlake Village, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 347 days.

(21) Appl. No.: 12/940,835

(22) Filed: Nov. 5, 2010

(51) Int. Cl.
*G06F 9/455* (2006.01)
(52) U.S. Cl. .................................. 718/1; 711/6
(58) Field of Classification Search ............ 718/1; 711/6
See application file for complete search history.

(56) References Cited

U.S. PATENT DOCUMENTS

| | | | |
|---|---|---|---|
| 7,500,048 B1 * | 3/2009 | Venkitachalam et al. | 711/6 |
| 2011/0153697 A1 * | 6/2011 | Nickolov et al. | 707/827 |
| 2011/0167473 A1 * | 7/2011 | Evans et al. | 726/1 |
| 2011/0264841 A1 * | 10/2011 | Duimovich et al. | 711/6 |

OTHER PUBLICATIONS

Czajkowski et al, Code sharing among virtual machines, Sun Microsystem Laboratory and Computer Science Department, Cornell University, 2002, pp. 1-22.*
Jin et al., The Effectiveness of Deduplication on Virtual Machine Disk Images, ACM 2009, pp. 1-12.*

* cited by examiner

*Primary Examiner* — Diem Cao
(74) *Attorney, Agent, or Firm* — Brill Law Office; Jeffrey Brill

(57) ABSTRACT

A data instance to be shared by multiple virtual machines is stored at a hypervisor level. A file system driver is provided to each virtual machine. Each virtual machine mounts a file system backed by the data instance, and thus has read access to the data through its mounted file system. A virtual machine is suspended. A copy of the data instance is saved as part of the stored image of the suspended virtual machine. The suspended virtual machine is subsequently restored from the stored image, and the copy of the data instance is present in the restored virtual machine. The copy of the data instance is detected at a hypervisor level, and the restored virtual machine is provided with read access to the data instance through its mounted filed system.

20 Claims, 5 Drawing Sheets

HYPERVISOR ASSISTED SINGLE INSTANCE DATA ACCESS BY MULTIPLE VIRTUAL MACHINES

TECHNICAL FIELD

This disclosure pertains generally to sharing data between multiple virtual computing devices, and more specifically to sharing a single instance of data between multiple virtual machines with support for virtual machine suspension, resumption and migration.

BACKGROUND

In the world of virtual computing, multiple virtual machines (VMs or guests) can be instantiated at a software level on a single physical computer (host computer). In various virtualization scenarios, a software component often called a hypervisor can act as an interface between the guests and the host operating system for some or all of the functions of the guests. In other virtualization implementations, there is no underlying host operating system running on the physical, host computer. In those situations, the hypervisor acts as an interface between the guests and the hardware of the host computer. Even where a host operating system is present, the hypervisor sometimes interfaces directly with the hardware for certain services. In some virtualization scenarios, the host itself is in the form of a guest (i.e., a virtual host) running on another host. The services described herein as being performed by a hypervisor are, under certain virtualization scenarios, performed by a component with a different name, such as "supervisor virtual machine," "virtual machine manager (VMM)," "service partition," or "domain 0 (dom0)." The name used to denote the component(s) performing specific functionality is not important.

The operation of individual virtual machines can be suspended and subsequently resumed. When a virtual machine is suspended, an image of the virtual machine, is stored in a format such as Open Virtualization Format (OVF). The OVF image of a virtual machine can later be used to resume the virtual machine on the host. Virtual machines can also be migrated between hosts, essentially by suspending the virtual machine on a first host and subsequently resuming it on a second host. Various optimizations exist to simulate the instantaneous or "live" migration of a running virtual machine from one host to another, for example by building as much of the virtual machine image on the second host in advance as possible, suspending the virtual machine on the first host, very quickly transmitting the active memory and precise execution state of the virtual machine to the second host, and then activating the virtual machine on the second host as quickly as possible. The suspend and restore can thus be done in sufficiently rapid succession to appear instantaneous to a user.

Sometimes it would be desirable for multiple virtual machines to be able to share the same data, in order to enable the group of virtual machines to be able access a single, large data set without each virtual machine having to store a copy. For example, it would be desirable for a group of virtual machines with a common hypervisor to share a single copy of a set virus definitions (100+ megabytes of information) to use for scanning files to detect malicious code, rather than require each separate virtual machine to store its own 100+ megabyte copy. This same concern is true for other types of large data sets.

However, if a group of virtual machines were sharing a single data set and an individual virtual machine of the group were suspended for subsequent restoration or migration, the shared data would become out of synchronization with either the suspended virtual machine or the non-suspended virtual machines. Because a suspended virtual machine must be restored into the exact state from which it was suspended, the shared data set would have to be frozen at the time of suspension to stay in synchronization with the suspended virtual machine. But, if other virtual machines sharing the data set were not suspended, the shared data set would have to remain active in order to stay in synchronization with them. However, if the shared data set were to become out of synchronization with any of the multiple virtual machines sharing the data, an error condition would result.

It would be desirable to address these issues.

SUMMARY

With hypervisor level assistance, shared access to a single data instance is provided to multiple virtual machines. The single data instance to be shared by a plurality of virtual machines is stored at a hypervisor level. In some embodiments, the single data instance is stored at a hypervisor level as a formatted disk image file which is internally treated as a series of blocks, although other storage formats are used in other embodiments. A file system driver is provided from a hypervisor level to each virtual machine of the plurality that is to share the single data instance. In some embodiments, the provided file system driver is in the form of a block driver. Each virtual machine of the plurality that is to share the single data instance mounts a file system backed by the hypervisor level single data instance, such that each virtual machine has read level access to the single data instance through its mounted file system. In some embodiments, mounting a file system backed by the hypervisor level single data instance further comprises mapping a formatted disk image file comprising the single data instance into each virtual machine of the plurality, such that the formatted disk image file appears to be a file system volume to each virtual machine. In such embodiments, read level access requests on each virtual machine for data from the shared data instance are filtered and relayed to the hypervisor by the block device driver via a hypervisor/virtual machine communication channel. The requested data from the shared data instance is then returned from the hypervisor to the block device driver on the requesting virtual machine via this channel.

Virtual machines with read level access to the single data instance can be suspended at a hypervisor level. When this occurs, an image of the suspended virtual machine is stored at a hypervisor level, and a copy of the single data instance is saved as part of the stored image of the suspended virtual machine, such that a subsequent restoration of the suspended virtual machine from the stored image comprises the saved copy of the single data instance being present in the restored virtual machine. Later, a suspended virtual machine is restored from a stored image containing a saved copy of the single data instance, such that the saved copy of the single data instance is present in the restored virtual machine. The saved copy of the single data instance in the restored virtual machine is detected at a hypervisor level. The restored virtual machine is provided with read level access to the single data instance through its mounted filed system, and the saved copy of the single data instance in the restored virtual machine is deleted.

In some embodiments, a count of a number of virtual machines with read level access to the single data instance is maintained at a hypervisor level. In response to one of the virtual machines with read level access of the single data instance being suspended, the count of the number of virtual machines with read level access to the single data instance is decrementing. In response to one of the virtual machines with read level access of the single data instance being restored, the count of the number of virtual machines with read level access to the single data instance is incremented.

In some embodiments, one or more additional single data instance(s) can be stored at a hypervisor level, and shared access to these additional single data instances can be provided to other pluralities of virtual machines.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
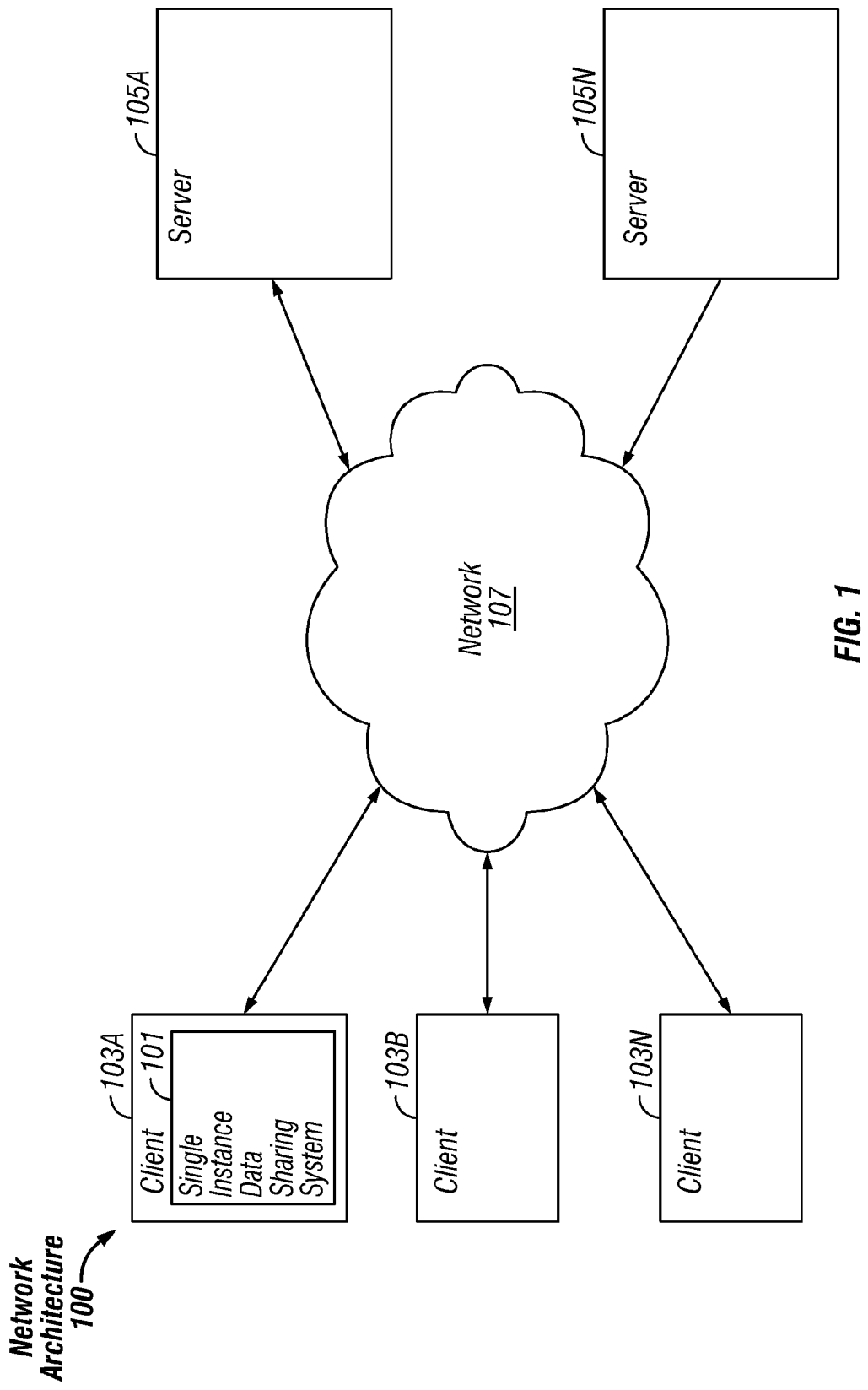
FIG. 1 is a block diagram of an exemplary network architecture in which a single instance data sharing system can be implemented, according to some embodiments.

FIG. 1 is a block diagram illustrating an exemplary network architecture 100 in which a single instance data sharing system 101 can be implemented. The illustrated network architecture 100 comprises multiple clients 103A, 103B and 103N, as well as multiple servers 105A and 105N. In FIG. 1, the single instance data sharing system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
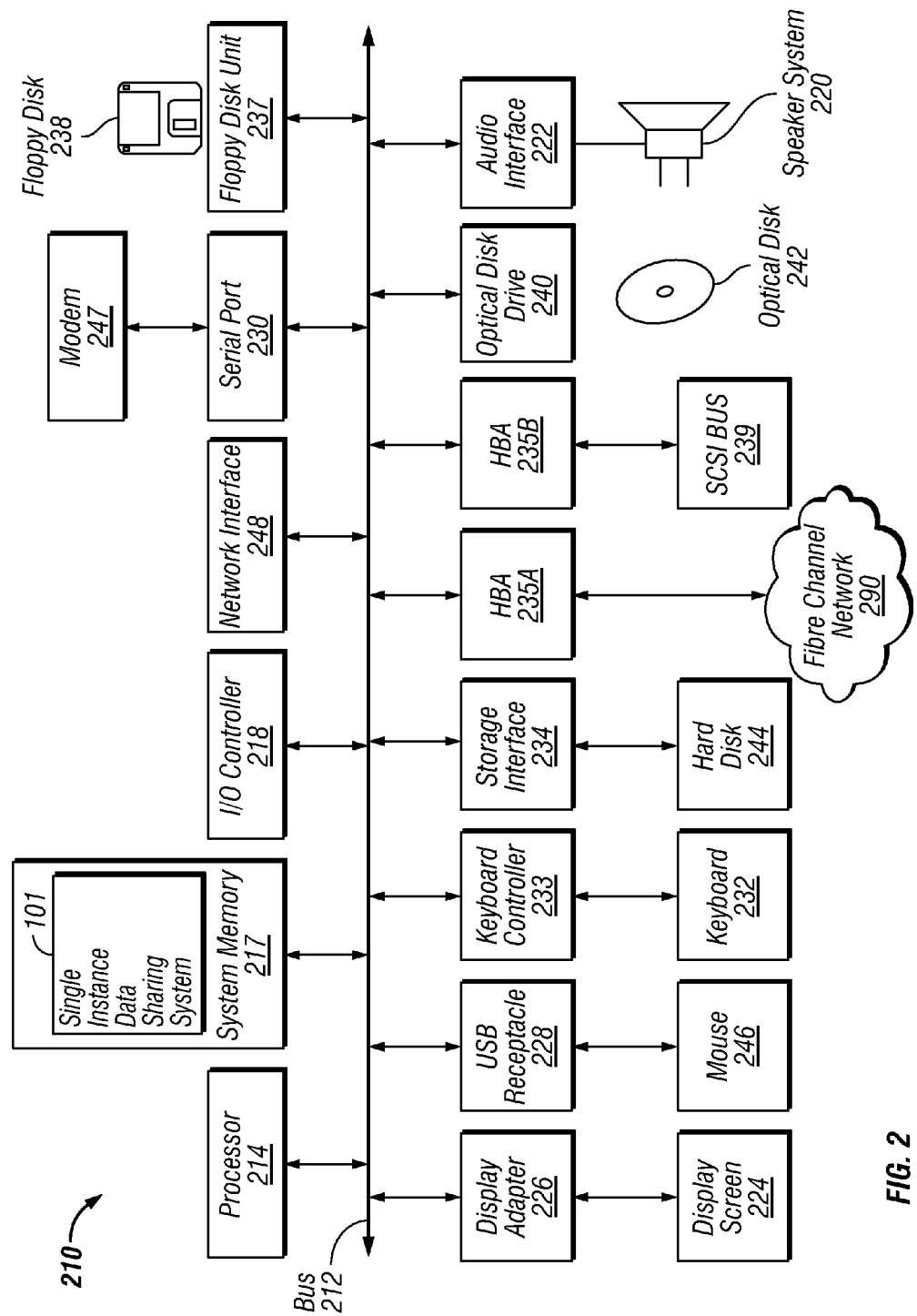
FIG. 2 is a block diagram of a computer system suitable for implementing a single instance data sharing system, according to some embodiments.

FIG. 2 is a block diagram of a computer system 210 suitable for implementing a single instance data sharing system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/ or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the single instance data sharing system 101 is illustrated as residing in system memory 217. The workings of the single instance data sharing system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
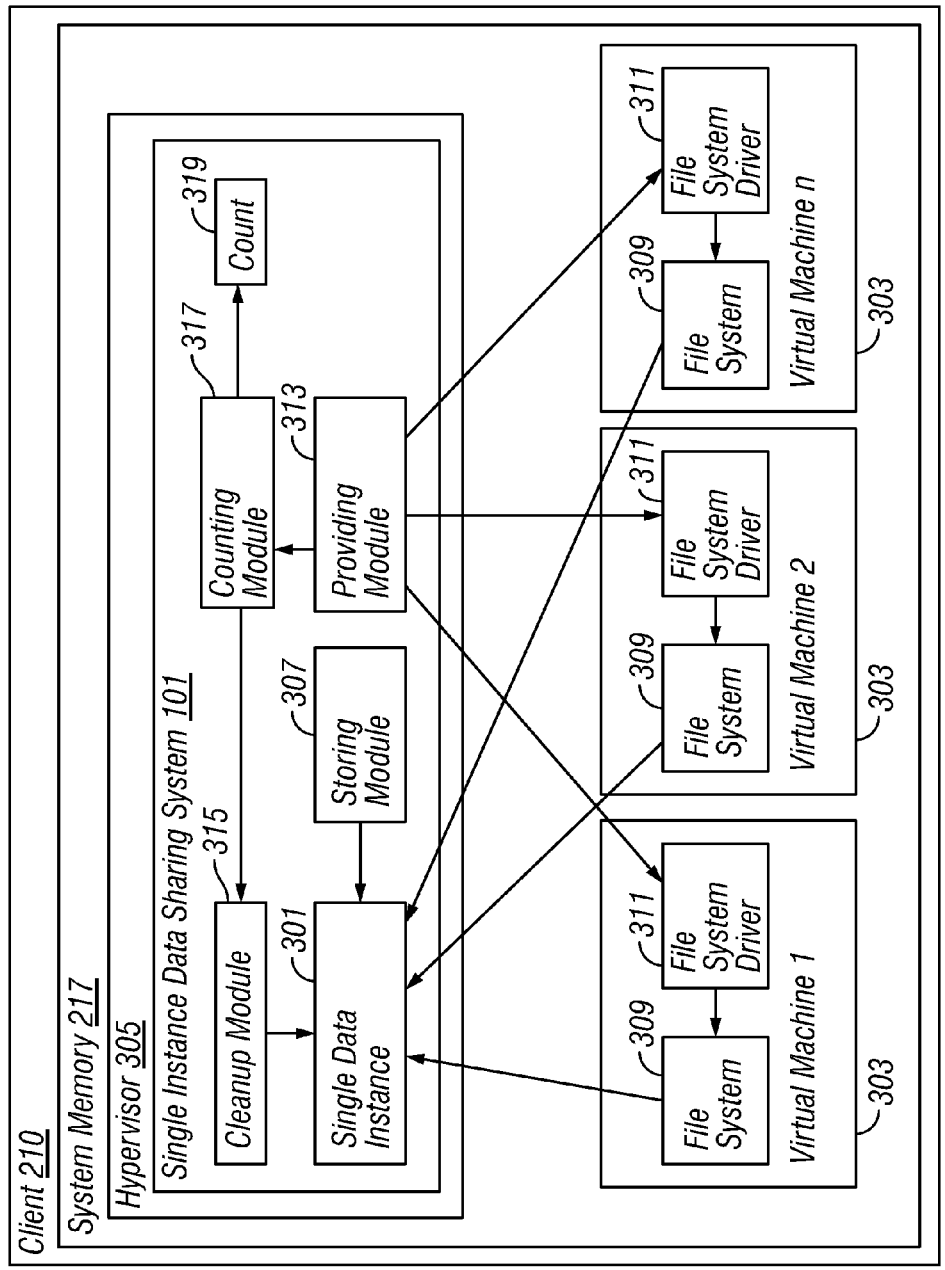
FIG. 3 is a block diagram of the operation of a single instance data sharing system, according to some embodiments.

FIG. 3 illustrates the operation of a single instance data sharing system 101 residing in the system memory 217 of a client computer 103, according to some embodiments. As described above, the functionalities of the single instance data sharing system 101 can reside on a client 103, a server 105, or be distributed between multiple computer systems 210, including within a cloud-based computing environment in which the functionality of the single instance data sharing system 101 is provided as a service over a network 107. It is to be understood that although the single instance data sharing system 101 is illustrated in FIG. 3 as a single entity, the illustrated single instance data sharing system 101 represents a collection of functionalities, which can be instantiated as a single or multiple modules as desired (an instantiation of specific, multiple modules of the single instance data sharing system 101 is illustrated in FIG. 3). It is to be understood that the modules of the single instance data sharing system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the single instance data sharing system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a single instance data sharing system 101 runs mostly at hypervisor 305 level with certain components running on the virtual machine 303 side. The single instance data sharing system 101 provides hypervisor 305 directed shared access of a single instance of data 301 to multiple virtual machines 303. As illustrated, multiple virtual machines 303 and a hypervisor 305 run in the computer memory 217 of a host 210, which can be in the form of a physical computer 210, for example of the type illustrated in FIG. 2. In FIG. 3, only three virtual machines 303 are shown for illustrative purposes, but in practice many more can be deployed. With the shared access, each virtual machine 303 has what appears to be a unique view of the single data instance 301, without requiring each virtual machine 303 to have its own copy thereof. For example, suppose the data instance 301 is in the form of 100 MB of shared virus definitions and there are fifteen virtual machines 303 sharing the data instance 301. In the scenario, only 100 MB of storage in the hypervisor 305 would be used for the shared data instance 301, as opposed to 100 MB in each virtual machine 303 for a total of 1.5 GB, as would required in a conventional system.

A storing module 307 of the single instance data sharing system 101 running at a hypervisor 305 level stores the single instance of data 301 to be shared by the virtual machines 303. A providing module 313 of the single instance data sharing system 101 prepares the data instance 301 on the hypervisor 305 side (in physical or logical form) such that it can be provided to the virtual machines 303 that will have shared access thereto. More specifically, the data instance 301 is provided in the form of a file system 309 in each virtual machine 303 sharing the data instance 301. Each virtual machine 303 accessing the shared instance of data 301 runs a file system driver 311 which serves the file system 309 backed by the data instance 301 into the virtual machine 303 environment. These file system drivers 311 can be thought of as virtual machine 303 side file system 309 driving modules of the single instance data sharing system 101. The file system drivers 311 can be installed on the virtual machines 303, or injected thereon by the hypervisor 305 side providing module 313. The file system drivers 311 running on the virtual machines 303 can be instantiated in various forms, such as an actual file system, a block device (on top of which a file system is loaded), or a mini-filter which redirects certain virtual machine 303 side input/output requests to the single instance data sharing system 101 on the hypervisor 305.

In one embodiment, a file system driver 311 is implemented as a block device driver, which emulates a device that consists of a series of readable blocks which comprise the shared data instance 301. In this embodiment, the shared data instance 301 can be implemented on the hypervisor 305 side as a formatted disk image file which is internally treated as a series of blocks which (when mapped into a virtual machine 303) appears to be a file system 309 volume. Read level access requests (e.g., read, open, etc.) on a virtual machine 303 for data from the shared data instance 301 are relayed by the file system driver 311 (e.g., the block device driver in this embodiment) to the providing module 313 on hypervisor 305 via a hypervisor/virtual machine communication channel. In response to these requests, the providing module 313 returns the requested shared data 301 to the file system driver 311 on the requesting virtual machine 303 via this channel.

While the above-described embodiment uses a block device driver on the virtual machines 303 and a formatted disk image file on the hypervisor 305 to share the data instance 301, it is to be understood that this is simply an example of a specific instantiation of this functionality. Although this specific implementation example is used to describe the functionality of sharing a hypervisor 305 side data instance 301 among multiple virtual machines 303 in conjunction with FIG. 3, it is to be understood that what specific implementation details to use to instantiate this functionality is a design choice. More specifically, this functionality can be implemented in the form of any valid file system 309 usable by the virtual machines 303, or any file system 309 filtering method which allows the intercepting of file enumeration/open/read operations on the virtual machines 303.

It is also to be understood that each virtual machine 303 can mount and manage multiple shared data instances 301. The example illustrated in FIG. 3 describes the mounting and managing of a single shared data instance 301 by three virtual machines 303. The same protocol can be repeated for each additional data instance 301 being shared by any number of virtual machines 303.

It is the hypervisor 305 side single instance data sharing system 101 that determines which virtual machines 303 are to have access to any given shared data instance 301. The hypervisor 305 side providing module 313 of the single instance data sharing system 101 notifies each of these virtual machines 303 to mount the file system 309. In response, the file system driver 311 on each notified virtual machine 303 introduces a new device instance into the virtual machine's operating system. The virtual machine's operating system sniffs the block device (or other device instantiation) and automatically loads the correct file system driver 311, thus creating a new volume (or other file system image) in the virtual machine 303 backed by the shared data instance 301 on the hypervisor 305. This occurs in each virtual machine 303 notified to mount the file system 309, at which point each such virtual machine 303 is sharing a read-only view of the same backing data instance 301.

A hypervisor 305 side counting module 317 of the single instance data sharing system 101 maintains a count 319 of the number of active virtual machines 303 with access to a particular data instance 301. When a new virtual machine 303 mounts the corresponding file system 309 as described above, the counting module 317 increments this usage count 319. When a virtual machine dismounts the file system 309 or shuts down, the counting module 317 decrements the usage count 319. When there are no remaining virtual machines with access to a given data instance 301 (i.e., the count 319 equals zero), a hypervisor 305 side cleanup module 315 of the single instance data sharing system 101 can delete the now unneeded backing data instance 301 (either immediately or as part of a subsequent cleanup cycle).

Figure 4:
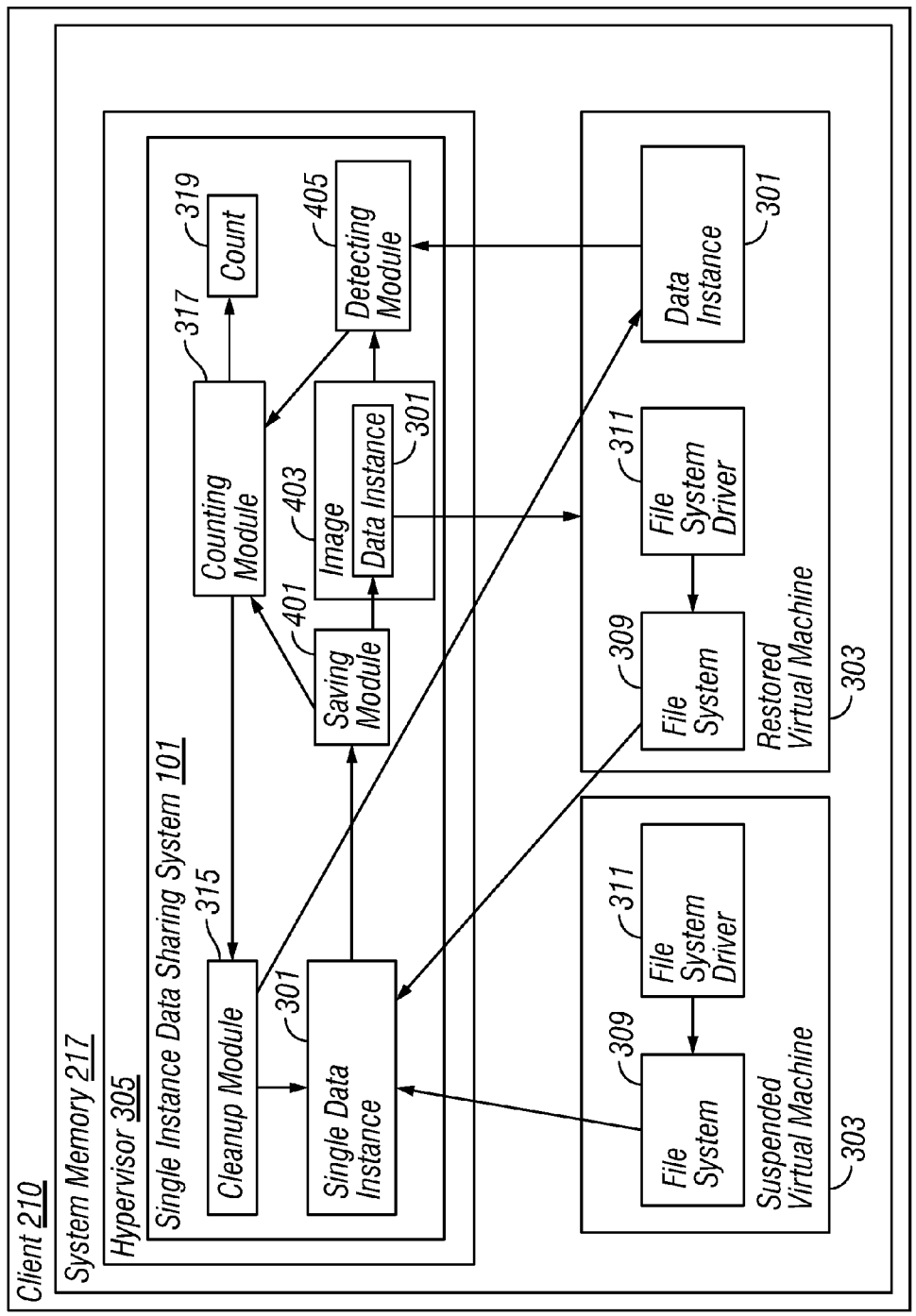
FIG. 4 is a block diagram of the operation of a single instance data sharing system supporting the suspension and restoration of virtual machines, according to some embodiments.

Turning now to FIG. 4, complexity is introduced by two virtualization features, the ability to arbitrarily suspend a virtual machine 303, and the ability to migrate a running virtual machine 303 to another host. Since these operations are not supported by the operating system but are instead controlled by the hypervisor 305, it is critical that when a suspended virtual machine 303 is restored, it is returned to the exact state from which it was suspended. Where a single data instance 301 is shared between multiple virtual machines 303 as described herein, the operating system of a specific virtual machine 303 may, at the time of suspension, have open and in-use file handles to data in the shared instance 301. Where this is the case, the shared data instance 301 must be guaranteed to still be available and consistent to the suspended virtual machine 301 when it is restored. A virtual machine 303 can remain suspended indefinitely (for seconds, minutes, hours, days, months, years, or possibly forever), and yet the single instance data sharing system 101 must still immediately provide a consistent data instance 301 from the time of suspension to a restored virtual machine 303. The migration of a running virtual machine 303 from one hypervisor 305 to another presents similar issues, and can be conceived of as a suspend on one host immediately followed by a resume on another.

To address these issues, when a virtual machine 303 with access to a shared data instances 301 is suspended, a data saving module 401 of the of the single instance data sharing system 101 saves a copy of the shared data instance 301 in the OVF image 403 (or image in another format where applicable) describing the suspended virtual machine 303. In some embodiments, the saved copy of the data instance 301 is in the form of a link to the data (e.g., a file system hard link) as opposed to a copy of the data itself (under hypervisors 305 that support this feature), so as not increase the storage requirements. When a virtual machine 303 is suspended, the counting module 317 decrements the usage count 319 of virtual machines 303 sharing the data instance 301, just as if the suspended virtual machine 303 dismounted the data instance 301 or shut down.

If a suspended virtual machine 303 is later restored, because the stored image 403 includes the copy of the data instance 301, so too does the restored virtual machine 303 which is built from the stored image 403. Because this copy of the data instance 301 is in the exact state of the data instance 301 at the time the virtual machine 303 was suspended, the restored virtual machine 303 has access to a consistent data instance 301 as required.

A detecting module 405 of the single instance data sharing system 101 detects the copy of data store 301 in the restored virtual machine 303, and takes ownership thereof, by providing the virtual machine 303 with access to the data instance 301 as a file system 309 as described above. Once the virtual machine 303 is accessing the data instance 301 via the above-described functionality provided by the single instance data sharing system 101, the cleanup module 315 deletes the virtual machine's copy of the data instance 301, the counting module 317 increments the usage count 319, and the single instance data sharing system 101 manages the virtual machine's access of the data instance 301 as if it had done so the entire time. Because migrating a virtual machine 303 is functionally equivalent to a suspend and a restore, this functionality works for migrated virtual machines 303 as well.

The above-described functionality of the single instance data sharing system 101 guarantees that virtual machines 303 have self consistent access to a shared single data instance 301, and can be safely resumed after suspension at any time. The counting and cleaning up functionality further ensures that data is not orphaned if a suspended virtual machine 303 is never restored.

Figure 5:
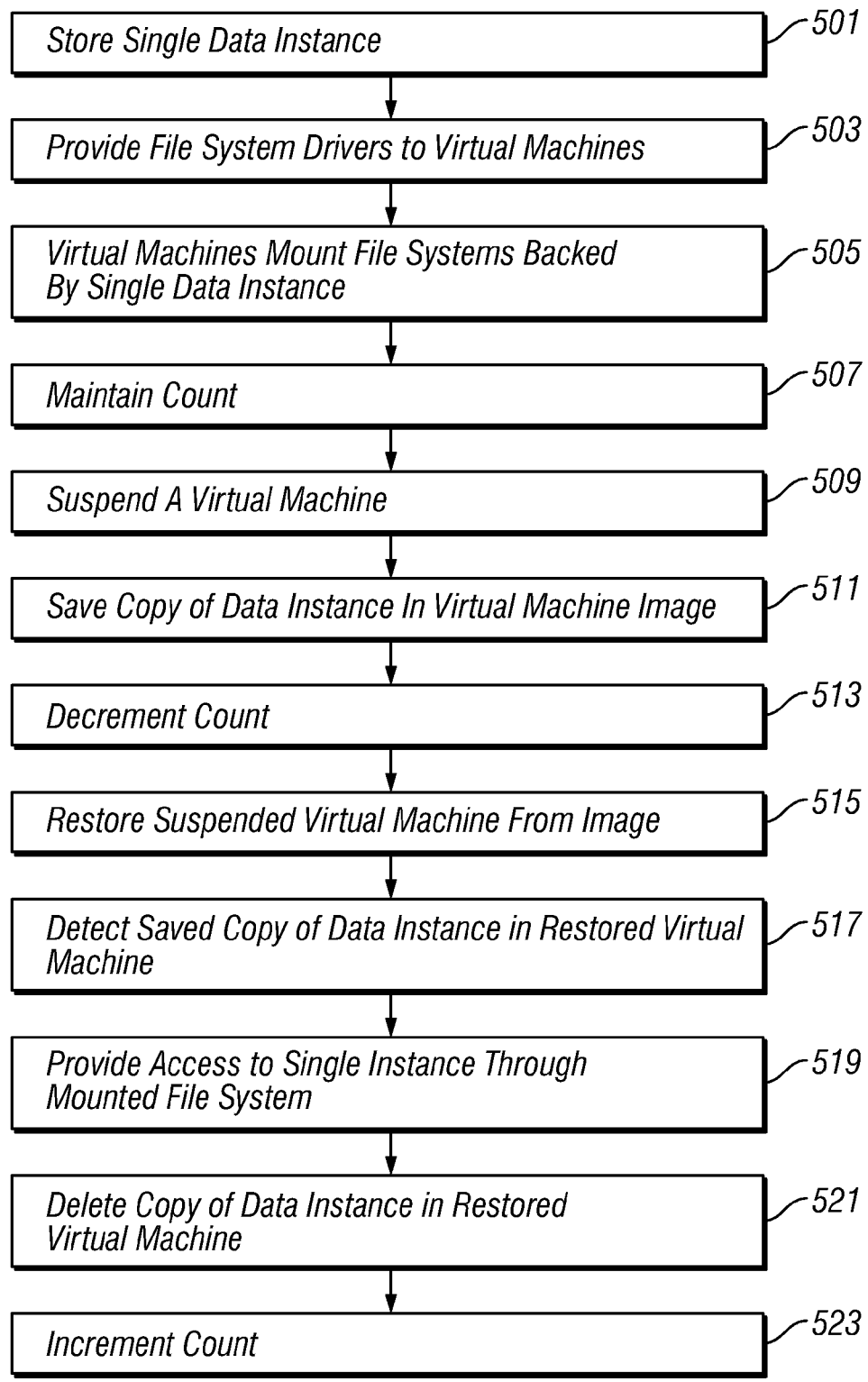
FIG. 5 is a flowchart of the operation of a single instance data sharing system, according to some embodiments.

FIG. 5 illustrates steps of the operation of the single instance data sharing system 101 (FIG. 1), according to some embodiments. A storing module 307 (FIG. 3) stores 501 the single data instance (FIG. 3) to be shared by a plurality of virtual machines 303 (FIG. 3) at a hypervisor 305 (FIG. 3) level. A providing module 313 (FIG. 3) provides 503 a file system driver 311 (FIG. 3) from a hypervisor 305 (FIG. 3) level to each virtual machine 303 (FIG. 3) that is to share the single data instance 301 (FIG. 3). Each virtual machine 303 (FIG. 3) that is to share the single data instance 301 (FIG. 3) mounts 505 a file system 309 (FIG. 3) backed by the hypervisor 305 (FIG. 3) level single data instance 301 (FIG. 3), such that each virtual machine 303 (FIG. 3) has read level access to the single data instance 301 (FIG. 3) through its mounted file system 309 (FIG. 3). A counting module 317 (FIG. 3) maintains 507 a count 319 (FIG. 3) of the number of virtual machines 303 (FIG. 3) with read level access to the single data instance 301 (FIG. 3).

A virtual machine 303 (FIG. 3) with read level access to the single data instance 301 (FIG. 3) is suspended 509 at a hypervisor 305 (FIG. 3) level. A saving module 401 (FIG. 4) saves 511 a copy of the single data instance 301 (FIG. 3) in an image 403 (FIG. 3) of the suspended virtual machine 303 (FIG. 3) which is stored at a hypervisor 305 (FIG. 3) level. In response to the virtual machine 303 (FIG. 3) with read level access of the single data instance 301 (FIG. 3) being suspended, the counting module 317 (FIG. 3) decrements 513 the count 319 (FIG. 3) of the number of virtual machines 303 (FIG. 3). Subsequently, the suspended virtual machine 303 (FIG. 3) is restored 515 from the stored image 403 (FIG. 4) containing the saved copy of the single data instance 301 (FIG. 3), such that the saved copy of the single data instance 301 (FIG. 3) is present in the restored virtual machine 303 (FIG. 3). A detecting module 405 (FIG. 4) detects 517 the saved copy of the single data instance 301 (FIG. 3) in the restored virtual machine 303 (FIG. 3). The providing module 313 (FIG. 3) provides 519 the restored virtual machine 303 (FIG. 3) with read level access to the single data instance 301 (FIG. 3) through its mounted filed system 309 (FIG. 3). The cleanup module 315 (FIG. 3) deletes 521 the saved copy of the single data instance 301 (FIG. 3) in the restored virtual machine 303 (FIG. 3). In response to the virtual machine 303 (FIG. 3) with read level access of the single data instance 301 (FIG. 3) being restored, the counting module 317 (FIG. 3) increments 523 the count 319 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for providing hypervisor assisted shared access to a single data instance by multiple virtual machines, the method comprising the steps of:
storing a single data instance at a hypervisor level, the stored single data instance to be shared by a plurality of virtual machines;
providing, from a hypervisor level, a file system driver to each virtual machine of the plurality that is to share the single data instance;
mounting a file system backed by the hypervisor level single data instance by each virtual machine of the plurality that is to share the single data instance, such that each virtual machine has read level access to the single data instance through its mounted file system;
suspending, at a hypervisor level, one of the virtual machines with read level access to the single data instance;
storing, at a hypervisor level, an image of the suspended virtual machine; and
saving a copy of the single data instance as part of the stored image of the suspended virtual machine, at a hypervisor level, such that a subsequent restoration of the suspended virtual machine from the stored image comprises the saved copy of the single data instance being present in the restored virtual machine.

2. The method of claim 1 further comprising:
restoring, at a hypervisor level, a suspended virtual machine from a stored image containing a saved copy of the single data instance, such that the saved copy of the single data instance is present in the restored virtual machine.

3. The method of claim 2 further comprising:
detecting, at a hypervisor level, the saved copy of the single data instance in the restored virtual machine;
providing the restored virtual machine with read level access to the single data instance through its mounted filed system, at a hypervisor level; and
deleting the saved copy of the single data instance in the restored virtual machine.

4. The method of claim 1 further comprising:
maintaining a count of a number of virtual machines with read level access to the single data instance, at a hypervisor level.

5. The method of claim 4 further comprising:
responsive to one of the virtual machines with read level access of the single data instance being suspended, decrementing the count of the number of virtual machines with read level access to the single data instance, at a hypervisor level.

6. The method of claim 4 further comprising:
responsive to one of the virtual machines with read level access of the single data instance being restored, incrementing the count of the number of virtual machines with read level access to the single data instance, at a hypervisor level.

7. The method of claim 1 wherein:
storing a single data instance further comprises storing, at a hypervisor level, a formatted disk image file which is internally treated as a series of blocks;
providing a file system driver to each virtual machine of the plurality that is to share the single data instance further comprises providing, from a hypervisor level, a block device driver to each virtual machine of the plurality that is to share the single data instance; and
mounting a file system backed by the hypervisor level single data instance by each virtual machine of the plurality further comprises mapping the formatted disk image file into each virtual machine of the plurality such that the formatted disk image file appears to be a file system volume to each virtual machine; the method further comprising:
filtering read level access requests on each virtual machine for data from the shared data instance;
relaying the filtered requests to the hypervisor by the block device driver via a hypervisor/virtual machine communication channel; and
returning, from the hypervisor, the requested data from the shared data instance to the block device driver on the requesting virtual machine via the hypervisor/virtual machine communication channel.

8. The method of claim 1 further comprising:
storing at least one additional single data instance at a hypervisor level, and providing shared access to the at least one additional single data to a second plurality of virtual machines.

9. At least one non-transitory computer readable storage medium storing a computer program product for providing hypervisor assisted shared access to a single data instance by multiple virtual machines, the computer program product comprising:
program code for storing a single data instance at a hypervisor level, the stored single data instance to be shared by a plurality of virtual machines;
program code for providing, from a hypervisor level, a file system driver to each virtual machine of the plurality that is to share the single data instance;
program code for mounting a file system backed by the hypervisor level single data instance by each virtual machine of the plurality that is to share the single data instance, such that each virtual machine has read level access to the single data instance through its mounted file system;
program code for suspending, at a hypervisor level, one of the virtual machines with read level access to the single data instance;
program code for storing, at a hypervisor level, an image of the suspended virtual machine; and
program code for saving a copy of the single data instance as part of the stored image of the suspended virtual machine, at a hypervisor level, such that a subsequent restoration of the suspended virtual machine from the stored image comprises the saved copy of the single data instance being present in the restored virtual machine.

10. The computer program product of claim 9 further comprising:
program code for restoring, at a hypervisor level, a suspended virtual machine from a stored image containing a saved copy of the single data instance, such that the saved copy of the single data instance is present in the restored virtual machine.

11. The computer program product of claim 10 further comprising:
   program code for detecting, at a hypervisor level, the saved copy of the single data instance in the restored virtual machine;
   program code for providing the restored virtual machine with read level access to the single data instance through its mounted filed system, at a hypervisor level; and
   program code for deleting the saved copy of the single data instance in the restored virtual machine.

12. The computer program product of claim 9 further comprising:
   program code for maintaining a count of a number of virtual machines with read level access to the single data instance, at a hypervisor level.

13. The computer program product of claim 12 further comprising:
   program code for, responsive to one of the virtual machines with read level access of the single data instance being suspended, decrementing the count of the number of virtual machines with read level access to the single data instance, at a hypervisor level.

14. The computer program product of claim 12 further comprising:
   program code for, responsive to one of the virtual machines with read level access of the single data instance being restored, incrementing the count of the number of virtual machines with read level access to the single data instance, at a hypervisor level.

15. The computer program product of claim 9 wherein:
   the program code for storing a single data instance further comprises program code for storing, at a hypervisor level, a formatted disk image file which is internally treated as a series of blocks;
   the program code for providing a file system driver to each virtual machine of the plurality that is to share the single data instance further comprises program code for providing, from a hypervisor level, a block device driver to each virtual machine of the plurality that is to share the single data instance; and
   the program code for mounting a file system backed by the hypervisor level single data instance by each virtual machine of the plurality further comprises program code for mapping the formatted disk image file into each virtual machine of the plurality such that the formatted disk image file appears to be a file system volume to each virtual machine; the computer program product further comprising:
   program code for filtering read level access requests on each virtual machine for data from the shared data instance;
   program code for relaying the filtered requests to the hypervisor by the block device driver via a hypervisor/virtual machine communication channel; and
   program code for returning, from the hypervisor, the requested data from the shared data instance to the block device driver on the requesting virtual machine via the hypervisor/virtual machine communication channel.

16. The computer program product of claim 9 further comprising:
   program code for storing at least one additional single data instance at a hypervisor level, and program code for providing shared access to the at least one additional single data to a second plurality of virtual machines.

17. A computer system for providing hypervisor assisted shared access to a single data instance by multiple virtual machines, the computer system comprising:
   at least one processor;
   system memory;
   means for storing a single data instance at a hypervisor level, the stored single data instance to be shared by a plurality of virtual machines;
   means for providing, from a hypervisor level, a file system driver to each virtual machine of the plurality that is to share the single data instance;
   means for mounting a file system backed by the hypervisor level single data instance by each virtual machine of the plurality that is to share the single data instance, such that each virtual machine has read level access to the single data instance through its mounted file system;
   means for suspending, at a hypervisor level, one of the virtual machines with read level access to the single data instance;
   means for storing, at a hypervisor level, an image of the suspended virtual machine; and
   means for saving a copy of the single data instance as part of the stored image of the suspended virtual machine, at a hypervisor level, such that a subsequent restoration of the suspended virtual machine from the stored image comprises the saved copy of the single data instance being present in the restored virtual machine.

18. The computer system of claim 17 further comprising:
   means for restoring, at a hypervisor level, a suspended virtual machine from a stored image containing a saved copy of the single data instance, such that the saved copy of the single data instance is present in the restored virtual machine.

19. The computer system of claim 18 further comprising:
   means for detecting, at a hypervisor level, the saved copy of the single data instance in the restored virtual machine;
   means for providing the restored virtual machine with read level access to the single data instance through its mounted filed system, at a hypervisor level; and
   means for deleting the saved copy of the single data instance in the restored virtual machine.

20. The computer system of claim 17 wherein:
   the means for storing a single data instance further comprises means for storing, at a hypervisor level, a formatted disk image file which is internally treated as a series of blocks;
   the means for providing a file system driver to each virtual machine of the plurality that is to share the single data instance further comprises means for providing, from a hypervisor level, a block device driver to each virtual machine of the plurality that is to share the single data instance; and
   the means for mounting a file system backed by the hypervisor level single data instance by each virtual machine of the plurality further comprises means for mapping the formatted disk image file into each virtual machine of the plurality such that the formatted disk image file appears to be a file system volume to each virtual machine; the computer system further comprising:
   means for filtering read level access requests on each virtual machine for data from the shared data instance;
   means for relaying the filtered requests to the hypervisor by the block device driver via a hypervisor/virtual machine communication channel; and
   means for returning, from the hypervisor, the requested data from the shared data instance to the block device driver on the requesting virtual machine via the hypervisor/virtual machine communication channel.

* * * * *